United States Patent
Jetton

(10) Patent No.: US 7,151,222 B1
(45) Date of Patent: Dec. 19, 2006

(54) ADJUSTABLE WIRE SHIELD

(75) Inventor: James Thomas Jetton, Ann Arbor, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/433,615

(22) Filed: May 15, 2006

(51) Int. Cl.
*H02G 3/04* (2006.01)

(52) U.S. Cl. ............. 174/68.3; 174/481; 174/480; 174/68.1; 52/220.1; 52/220.7

(58) Field of Classification Search ............. 174/480, 174/481, 496, 503, 68.1, 68.3, 72 R, 72 A, 174/72 C, 70 C, 95, 96, 98, 99 R, 97, 70 R, 174/135; 439/207–216; 220/3.2, 3.3, 3.8, 220/4.02, 4.01; 52/220.1, 220.3, 220.5, 220.7, 52/239; 119/428; 248/125.8, 125.9
See application file for complete search history.

(56) References Cited

U.S. PATENT DOCUMENTS

| | | | |
|---|---|---|---|
| 2,841,634 A * | 7/1958 | Kimball | 174/45 R |
| 3,573,344 A * | 4/1971 | Snyder | 174/481 |
| 3,907,334 A * | 9/1975 | Schera, Jr. | 174/86 |
| 4,812,958 A * | 3/1989 | Rolfe et al. | 174/493 |
| 5,041,002 A * | 8/1991 | Byrne | 439/211 |
| 5,106,040 A | 4/1992 | Cafmeyer et al. | |
| 5,661,263 A * | 8/1997 | Salvaggio | 174/68.3 |
| 5,962,814 A | 10/1999 | Skipworth et al. | |
| 6,087,593 A | 7/2000 | Skipworth et al. | |
| 6,143,984 A * | 11/2000 | Auteri | 174/68.3 |
| 6,343,568 B1 * | 2/2002 | McClasky | 119/428 |
| 6,395,974 B1 * | 5/2002 | Argaut et al. | 174/98 |
| 6,521,835 B1 * | 2/2003 | Walsh | 174/68.3 |
| 6,875,924 B1 * | 4/2005 | Porter et al. | 174/70 R |
| 6,903,275 B1 | 6/2005 | Jetton | |

* cited by examiner

*Primary Examiner*—Angel R. Estrada
(74) *Attorney, Agent, or Firm*—Daniel R. Edelbrock

(57) ABSTRACT

A wire shield has a first tubular section for attachment to a fixed component. A second tubular section is integrally joined to the first tubular section along a common longitudinal axis. The second tubular section has an outer diameter with an outer surface. A small key protrudes from the outer surface. A third tubular section has an inner diameter slightly larger than the outer diameter of the second tubular section. An opening having spaced borders extends through the third tubular section. The third tubular section is fit around, and is able to slide upon, the second tubular section with the key positioned in the opening. A mounting device and a support for an electrical connector extending from the third tubular section are adjustable in longitudinal and angular position relative to the first and second tubular sections within limits defined by contact of the key with the borders of the opening.

18 Claims, 5 Drawing Sheets

ADJUSTABLE WIRE SHIELD

BACKGROUND OF THE INVENTION

1. Field of the Invention

The invention relates in general to shields for vehicle wire harnesses and more particularly to a shield having a part that can alter a length of the shield and change angular position to accommodate installation requirements.

2. Discussion of Related Art

In vehicles and other environments, electrical cables and wire harnesses need to be guided to an electrical component from a power supply, restrained from unnecessary or damaging movement, and protected from contaminants. For example, in automotive vehicles, a fan clutch is often used to engage or disengage a radiator fan based on engine or engine coolant temperature. An electrical cable or wire harness is routed to the fan clutch assembly to power the clutch based on, for example, a signal from a thermostat. The wire harness needs to be somewhat protected from the elements and prevented from interfering with the fan. Wire harness shields in this type of environment are often molded in one piece and secured to brackets extending from vehicle components in the engine compartment. An example of such a shield is shown in U.S. Pat. No. 6,903,275.

Some existing wire harness shields, such as those used in vehicle steering columns, have parts that can slide relative to each other after installation. However, extending a shield without the ability to rotate ends of the shield relative to each other often prevents or makes very difficult assembly and installation of the shield. U.S. Pat. No. 5,106,040 discloses a steering column wire protector that enables axial and rotational movement of the harness after installation. In this case, the wiring is fixed in position to a carrier, and the carrier has a slide pin that can move axially and rotationally relative to a bracket holding the carrier to a steering column. The protector does not change in length and one end of the protector does not rotate relative to another end.

SUMMARY OF THE INVENTION

Accordingly, it is an object of this invention to provide a wire shield that can both change in length and rotate relative to a fixed end.

Another object of the invention is to enable a mounting device and electrical connector support extending from the shield to be adjusted in spatial position for ease of installation.

A further object of the invention is to design the wire shield such that it can be molded in one piece.

In carrying out this invention in the illustrative embodiment thereof, the wire shield is molded as one piece that can be cleanly separated or broken into generally two halves or parts prior to assembly onto the wire harness. A first part has a section with a reduced outside diameter. A key or protuberance extends from an outer surface of the section. The first part is closed around a wire harness. A second, sliding part has an inner diameter sized to receive the section of the first part and a window or opening through which the protuberance extends when the second part is fitted around the first part. The second part slides on the section of the first part within limits defined by the movement of the protuberance between borders of the opening.

The wire shield is therefore capable of specific change in length and angle. The second part of the shield can rotate and extend to improve assembly conditions and allow use in multiple package applications. The motion limiting key and window permit a controlled amount of rotation and translation between the two halves or parts of the shield. The sliding and rotating part enables the shield to avoid other parts in the assembly environment that would otherwise obstruct the assembly process.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
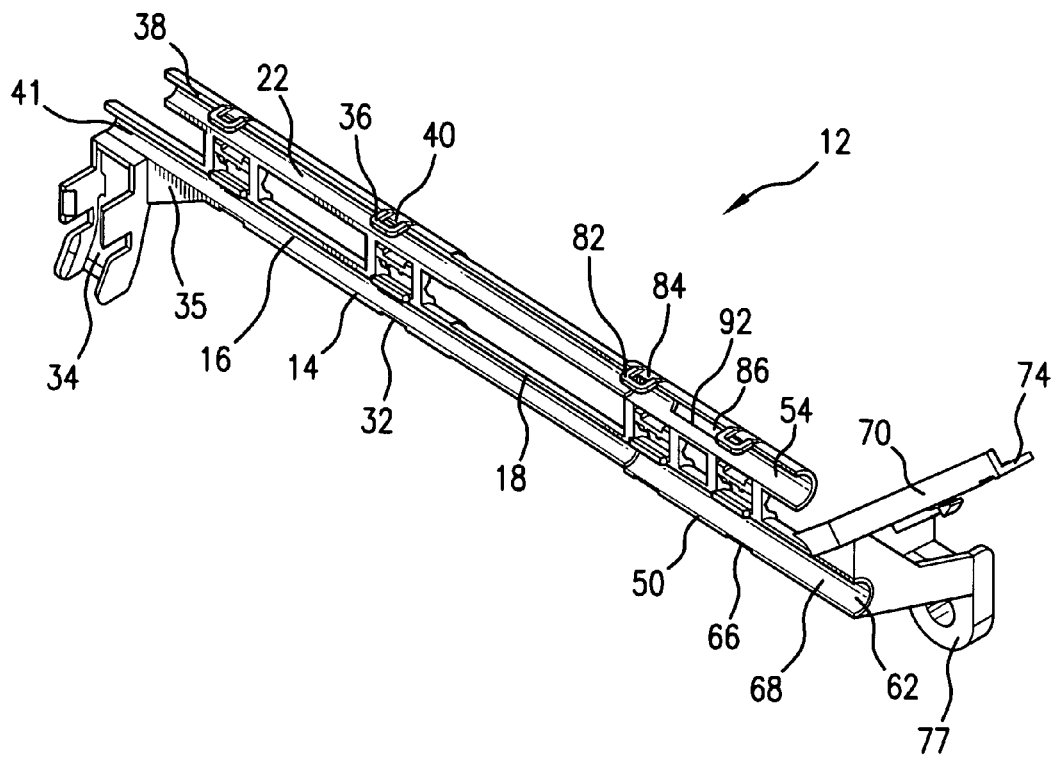
FIG. 1 is a perspective view of the wire harness shield according to the present invention as molded in one piece.
Figure 2:
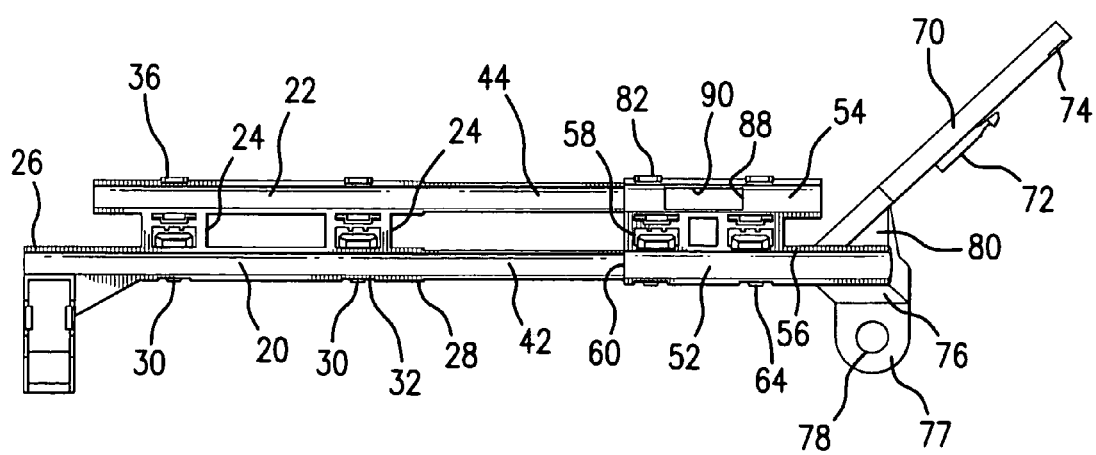
FIG. 2 is a plan view of the wire harness shield as molded in one piece.

Referring now to FIGS. 1 and 2, a wire protector or shield 12 according to the present invention is molded in one piece from a suitable, electrically non-conductive plastic such as Nylon. The shield 12 has a first or main conduit or part 14 including a first tubular section 16 and a second tubular section 18. The first tubular section 16 has a base portion 20 and a lid portion 22 attached to the base portion 20 by integral, resilient hinges 24. The base portion 20 has a first end 26 and a second end 28. Latch projections 30 in channels or recesses 32 are spaced between the two ends. A securing means or device 34 is joined to the first end 26 of the base portion 20. The securing device 34 may take many forms according to the environment in which the wire shield 12 is to be used. In the illustrated embodiment meant as an example, the device 34 is a rectangular-shaped framework designed and shaped to snap onto a component such as a vehicle fan clutch assembly. A strut member 35 between the device 34 and base portion 20 reinforces the structure.

The lid portion 22 of the first tubular section 16 has spaced latch tabs 36 along an edge 38. The latch tabs 36 have apertures 40 and are aligned with the projections 30 in recesses 32 on the base portion 20 such that when the lid portion 22 is pivoted or moved by use of the hinges 24 to fit against the base portion, the latch tabs are received in the recesses and the tab apertures receive the latch projections. This arrangement positions and latches the lid portion 22 on the base portion 20 to form a complete, closed tube or conduit, except for a short segment 41 adjacent the first end 26 of the base portion 20. The hinges 24 are also aligned with the latch tabs 36 and latch projections 30 for stability and ease of operation and alignment.

The second tubular section 18 has a base portion 42 and a lid portion 44. The base portion 42 and lid portion 44 extend from the base portion 20 and lid portion 22, respectively, of the first tubular section 16. The base and lid portions 41 and 44 of the second tubular section 18 fit against each other to form a complete tube or conduit with the first tubular section 16 when the lid portion 22 of the first tubular section is pivoted or moved by use of the hinges 24 to fit against the base portion 20. The second tubular section 18 is sized to have a smaller outside or outer diameter than an outer diameter of the first tubular section 16. This is accomplished by having a wall thickness of the second tubular section 18 reduced relative to a wall thickness of the first tubular section 16 where the first tubular section is joined to a first end of the second tubular section, as best illustrated in FIG. 2. In other words, the step down in thickness occurs at the second end 28 of the first tubular section 16.

Figure 5:
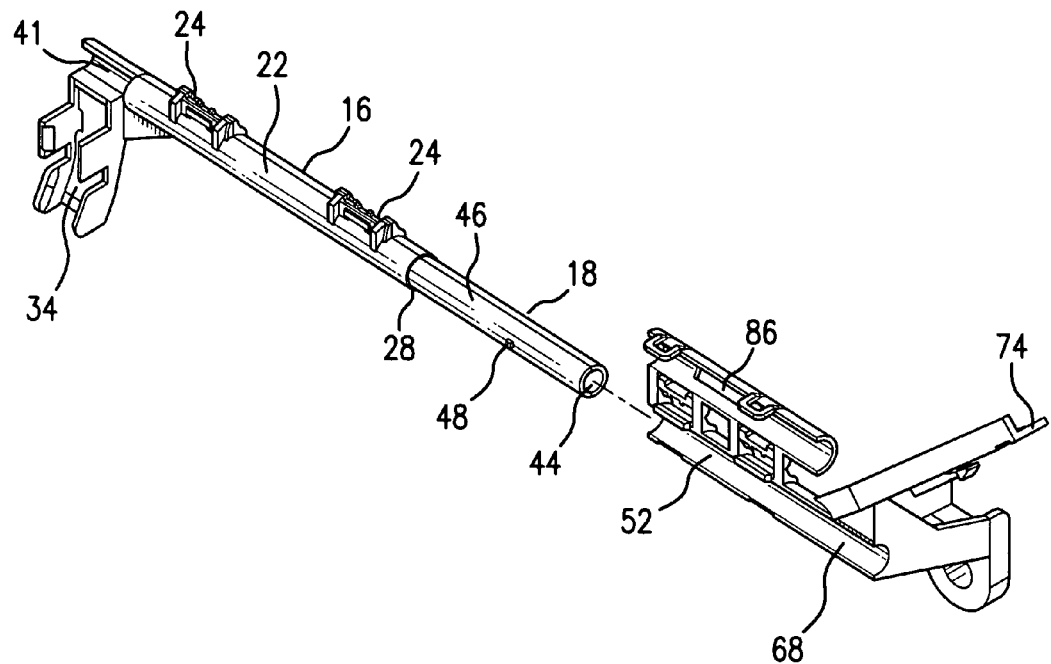
FIG. 5 is a perspective view of the shield with a main part closed.
Figure 6:
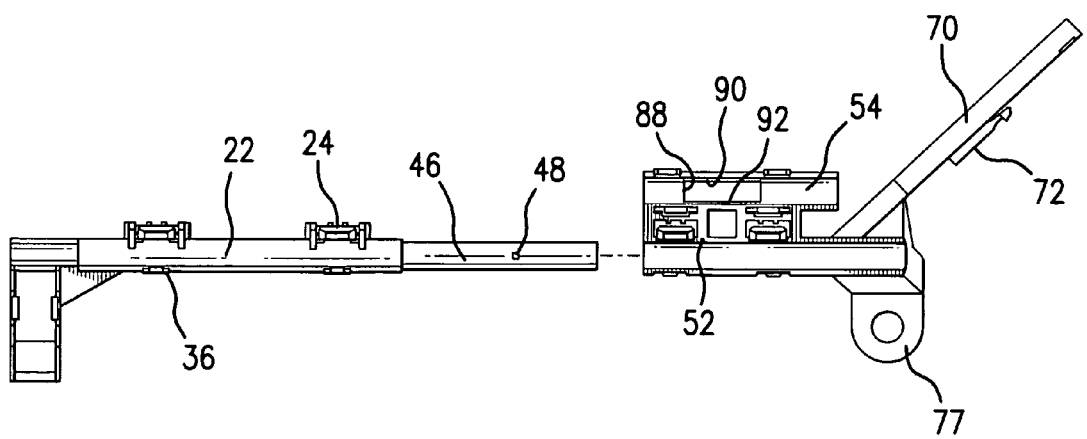
FIG. 6 is a plan view of the shield with the main part closed.

The lid portion 44 of the second tubular section 18 has an outer circumferential surface 46 as best shown in FIGS. 5 and 6. A relatively small protuberance, pin or key 48 extends outward from the surface 46. The key 48 is illustrated as being narrowly rectangular or block-shaped and short and length, but it may be cylindrical or take other forms.

The wire shield has a sliding or second conduit or part 50 that has a base portion 52 and lid portion 54 forming a third tubular section 56. The third tubular section 56 as molded is attached to a second end of the second tubular section 18 distal from the first tubular section 16. The first, second and third tubular sections 16, 18 and 56 have a common longitudinal axis. The lid portion 54 of the third tubular section 56 is joined to the base portion 52 by integral resilient hinges 58. The base portion 52 has a first end 60 and a second end 62. Spaced latch projections 64 in channels or recesses 66 project from the base portion 52. The second end 62 of the base portion 52 is joined by a short guideway 68 to an angled support 70 for an electrical connector (not shown). The support 70 has a bracket 72 for securing the electrical connector to the support. The support 70 also includes an extension 74 for receiving a clip (not shown) to attach a wire harness to the support. Wires of the attached harness would be terminated in the electrical connector.

A mounting means or device 76 is also joined to the second end 62 of the base portion 52 of the third tubular section 56 by the guideway 68. The mounting device 76 is depicted as including a flange 77 with a through-hole 78 for receiving a bolt that would, in the example embodiment, secure the wire shield 12 to an engine block. Other types of mounting means, such as a clamp or a nut for tightening onto a stud bolt extending from the engine block, could be used. A brace member 80 between the support 70 and the mounting device 76 strengthens the shield 12 at this location.

Figure 4:
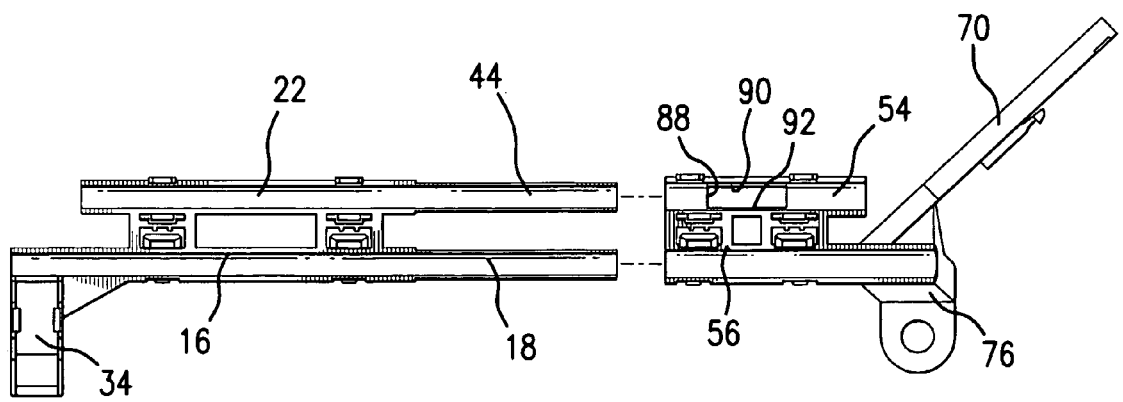
FIG. 4 is a plan view of the shield broken into two parts.

The lid portion 54 of the third tubular section 56 includes spaced latch tabs 82 with apertures 84 that are aligned with the recesses 66 and latch projections 64 on the base portion 52 such that when the lid portion 54 is closed on the base portion 52 the portions are latched together to form a complete tube or conduit except for the open guideway 68. An inner diameter of the third tubular section 56 is sized slightly larger than the outer diameter of the second tubular section 18, as best illustrated in FIGS. 2 and 4. The lid portion 54 has an elongated window, opening or slot 86. The slot 86 has two side perimeters or borders 88 corresponding to longitudinal ends of the slot, a top perimeter or border 90, and a bottom perimeter or border 92. Though illustrated as being generally rectangular in the plan view of FIG. 2, the slot 86 could have other shapes and sizes depending on design requirements.

Figure 3:
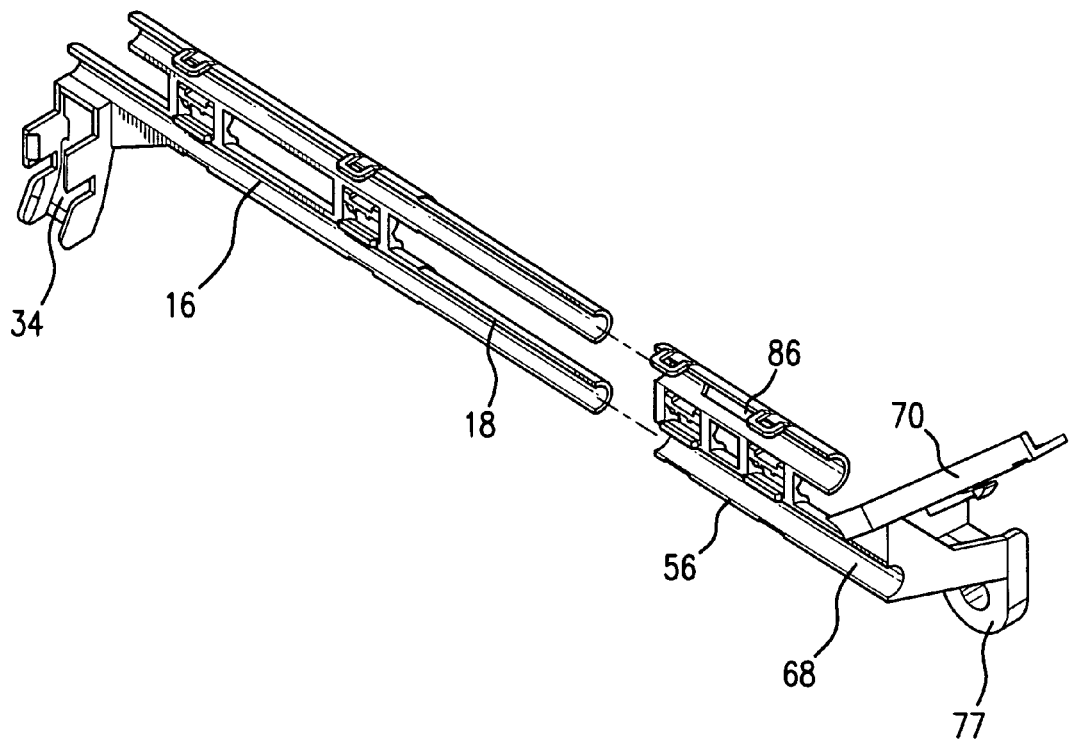
FIG. 3 is a perspective view of the shield broken into two parts.
Figure 7:
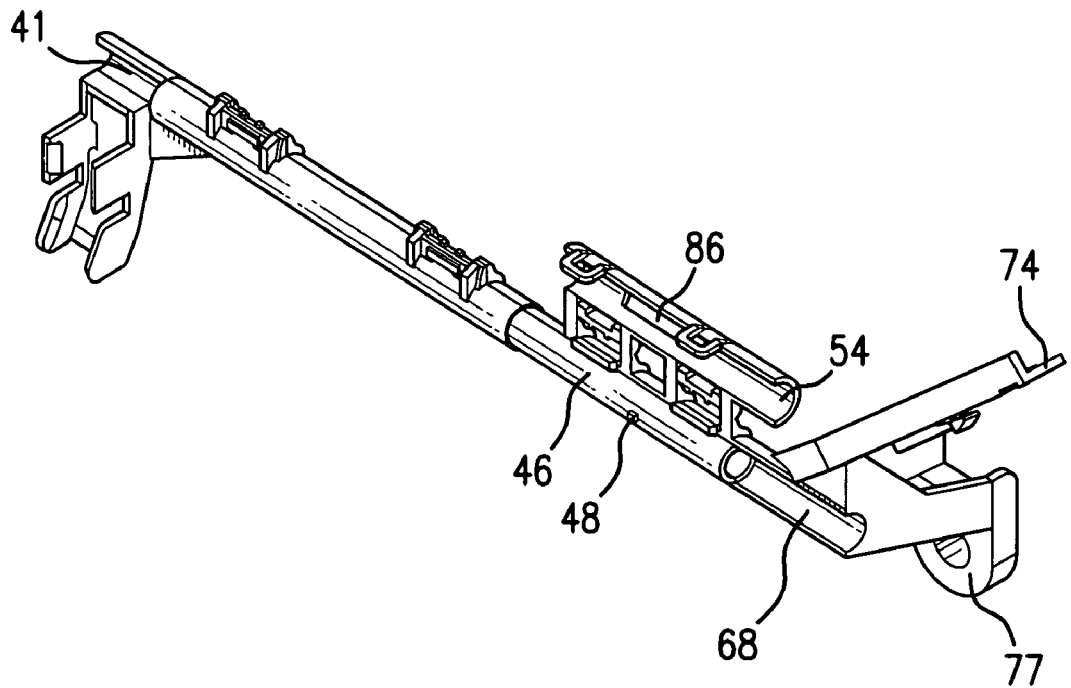
FIG. 7 is a perspective view of the shield with a second, sliding part fit around the first part.
Figure 8:
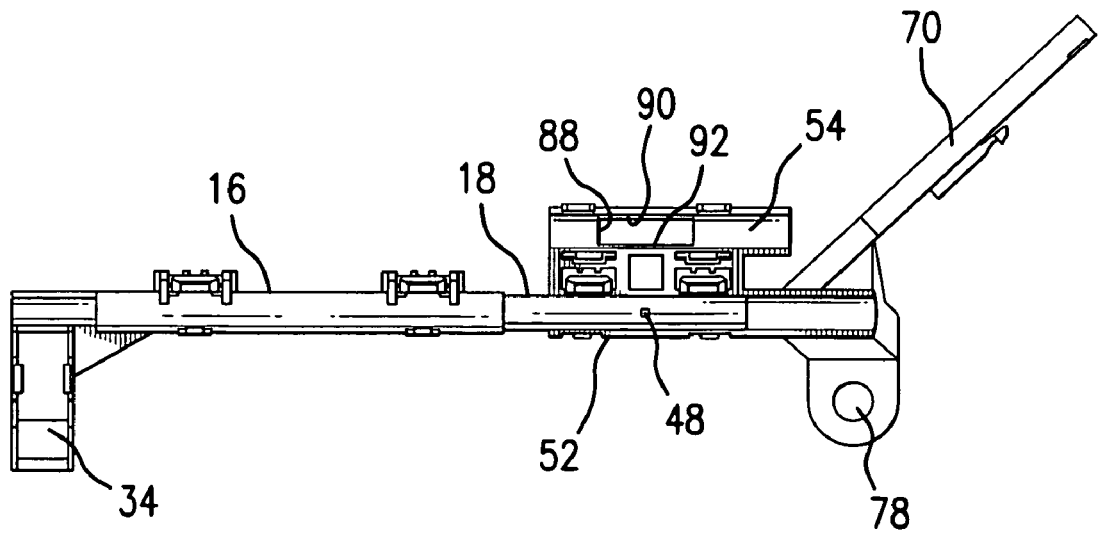
FIG. 8 is a plan view of the shield with the second part fit around the first part.

FIGS. 1 and 2 illustrate the wire shield in the one-piece form as taken from the mold. In FIGS. 3 and 4 the third tubular section 56 is separated from the second tubular section 18. The thickness of the shield material at this location is such that the sections can be cleanly broken apart or separated by hand. In the example embodiment, the wire shield 12 is used to enclose a wire harness extending from the electrical connector attached to the support 70 to a second electrical connector (not shown) snapped onto the fan clutch assembly adjacent to the first end 26 of the first tubular section 16. The shield 12 keeps the wire harness from interfering with the fan. The harness is laid in the base portions 20 and 42 of the first and second tubular sections 16 and 18, respectively, and the lid portions 22 and 44 are closed over the harness or wire and latched in this position, as suggested by FIGS. 5 and 6. Then the base portion 52 of the third tubular section 56 is fit around the base portion 42 of the second tubular section 18, as demonstrated in FIGS. 7 and 8, with the wire harness positioned in the open guideway 68.

Figure 9:
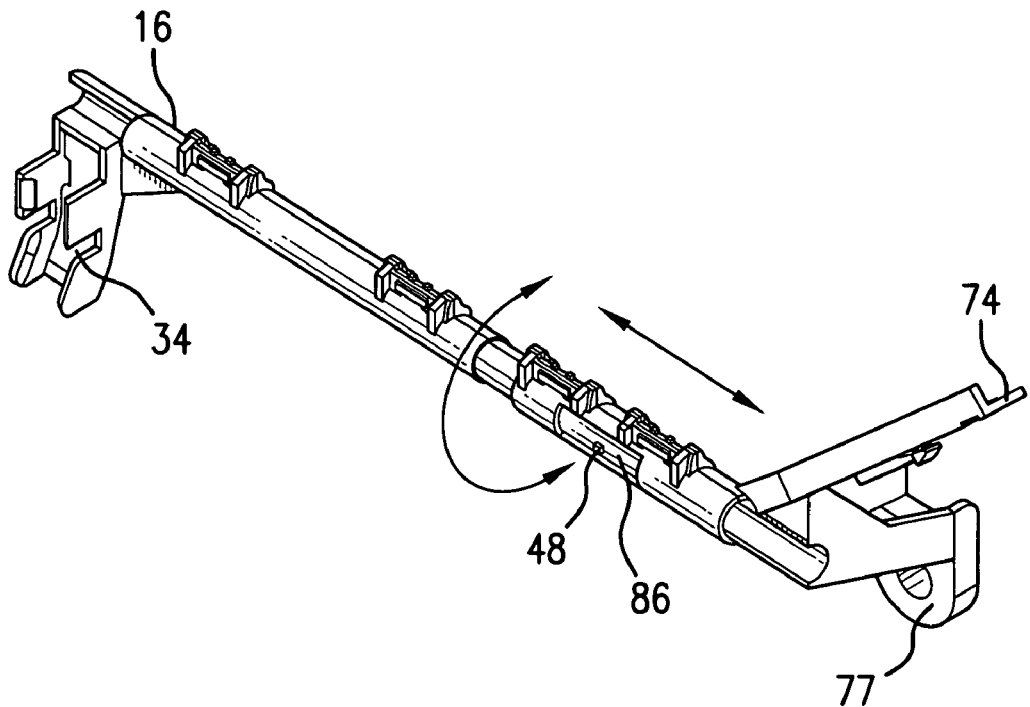
FIG. 9 is a perspective view of the shield with the second part completely closed around the first part.
Figure 10:
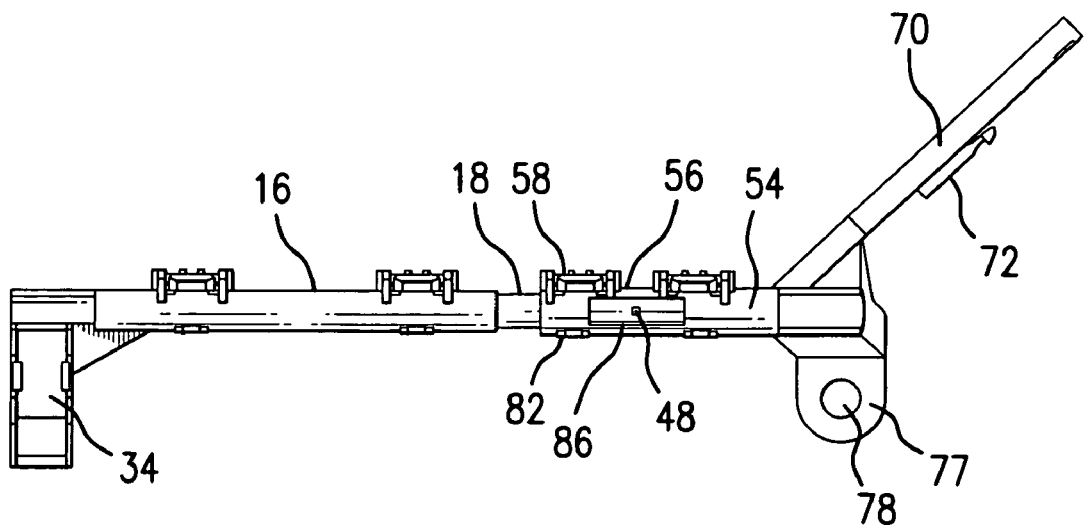
FIG. 10 is a plan view of the shield with the second part completely closed around the first part.

The lid portion 54 of the third tubular section 56 is then closed around the second tubular section 18, with the key 48 received in the slot 86, as illustrated in FIGS. 9 and 10. The key 48 and slot 86 act as positioning means to properly locate the third tubular section 56 on the second tubular section 18. The key or protuberance 48 allows the third tubular section 56 to move in four main directions, longitudinally back and forth and rotationally up and down as oriented in the drawing figures. There would be enough slack designed into the harness to let the third tubular section 56 slide along and rotate about the second tubular section 18 within predetermined limits or parameters defined by the movement of the key 48 within the borders of the slot 86.

This type of relative connection enables wire shield 12 to change in length so the mounting means 76 can be properly positioned according to the location of a bolt hole on the engine block. It also enables the sliding part 50 of the shield to rotate and thereby adjust the spatial position of the connector support 70 to accommodate the orientation of the electrical connector within predetermined limits set by the sizes of the protuberance 48 and the opening 86. The invention, therefore, during installation of the wire shield 12, provides for different lengths and angular requirements. When the mounting device 76 is bolted in position and the electrical connector is secured on the support 70, the third tubular section 56 is fixed in position relative to the main part 14 and the installation of the wire shield is concluded.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A wire shield for routing a wire to a component, the wire shield comprising:
a main part having a first tubular section for receiving the wire, the first tubular section having a first end and a second end, the first tubular section being joined at the second end to a second tubular section for receiving the wire, the second tubular section having an outer surface and a smaller outside diameter than the first tubular section, the first and second tubular sections having a common longitudinal axis;

means joined to the first end of the first tubular section for securing the main part to the component such that the main part is prevented from moving linearly along and rotationally about the longitudinal axis;

a protuberance extending outward from the outer surface of the second tubular section;

a sliding part having a third tubular section for receiving the wire, the third tubular section being sized to fit around the outside diameter of the second tubular section, the third tubular section having an opening for receiving the protuberance when the third tubular section is fit around the second tubular section, the opening being larger than the protuberance such that the sliding part is arranged to move along the longitudinal axis of the main part and rotate relative to the longitudinal axis of the main part within parameters defined by borders of the opening; and means attached to the sliding part for mounting the sliding part in a generally fixed position relative to the main part, wherein the opening and protuberance accommodate a required spatial location for the mounting means.

2. The wire shield of claim 1 wherein the securing means is a snap framework.

3. The wire shield of claim 1 wherein the mounting means is a flange with a through-hole.

4. The wire shield of claim 1 wherein each tubular section has a base portion and a lid portion, the lid portions of the first and third tubular sections being attached by resilient hinges to the base portions of the first and third tubular sections, respectively.

5. The wire shield of claim 4 wherein the base and lid portions of the first and second tubular sections are integrally joined.

6. The wire shield of claim 5 wherein the wire shield is formed as one piece with the base and lid portions of the third tubular section integrally joined to the base and lid portions of the second tubular section, respectively, the base and lid portions of the third tubular section being separable from the base and lid portions of the second tubular section prior to fitting the third tubular section around the outside diameter of the second tubular section.

7. A wire protector comprising:
a first conduit for receiving the wire;
a second conduit for receiving the wire; and
means for positioning the second conduit on the first conduit such that the second conduit is extendable and rotatable relative to the first conduit within predetermined parameters, the positioning means comprising a key on the first conduit and a window on the second conduit, the window being sized to enable the second conduit to move in four main directions.

8. The wire protector of claim 7 wherein the window is in a section of the second conduit that fits around a section of the first conduit, the key being located on an outer surface of the section of the first conduit.

9. A wire shield comprising:
a first tubular section having a first end and a second end;
a second tubular section having a first end integrally joined to the second end of the first tubular section, the second tubular section having an outer diameter and an outer surface, the second tubular section further including a protuberance extending from the outer surface; and
a third tubular section having a first end and a second end, the first end of the third tubular section being integrally joined to the second end of the second tubular section, the third tubular section having an inner diameter slightly larger than the outer diameter of the second tubular section, the third tubular section further having an opening larger in size than the protuberance on the outer surface of the second tubular section, each tubular section having a lid portion and a base portion, the lid and base portions of the first and third tubular sections being attached together by resilient hinges.

10. The wire shield of claim 9 further comprising a securing device on the first end of the first tubular section for fixing the first and second tubular sections to a component.

11. The wire shield of claim 9 further comprising a mounting device on the second end of the third tubular section for attaching the third tubular section to a fixed location.

12. The wire shield of claim 9 further comprising a support extending at an angle from the third tubular section.

13. The wire shield of claim 12 further comprising a bracket on the support for attaching an electrical connector to the third tubular section.

14. The wire shield of claim 13 wherein the support includes an extension for receiving a wire harness clip, whereby both the electrical connector and a wire harness terminated in the electrical connector would be held by the support.

15. The wire shield of claim 9 wherein a thickness of the shield at a location where the first end of the third tubular section is integrally joined to the second end of the second tubular section is sized such that the third tubular section can be cleanly separated from the second tubular section at the location.

16. The wire shield of claim 9 further comprising cooperating latch means on the lid and base portions of the first and third tubular sections such that the lid portions and base portions close and latch around a wire.

17. The wire shield of claim 9 wherein the opening has two spaced side borders, and a top border spaced from a bottom border.

18. The wire shield of claim 17 wherein the protuberance is a small rectangular-shaped pin.

* * * * *